US008271004B2

(12) United States Patent
Vinding

(10) Patent No.: US 8,271,004 B2
(45) Date of Patent: Sep. 18, 2012

(54) USER GENERATED DYNAMIC MOBILE SERVICE

(76) Inventor: Mikael Vinding, Atlanta, GA (US)

( * ) Notice: Subject to any disclaimer, the term of this patent is extended or adjusted under 35 U.S.C. 154(b) by 1141 days.

(21) Appl. No.: 11/891,142

(22) Filed: Aug. 8, 2007

(65) Prior Publication Data

US 2008/0096594 A1 Apr. 24, 2008

Related U.S. Application Data

(60) Provisional application No. 60/836,161, filed on Aug. 8, 2006.

(51) Int. Cl.
*H04W 4/00* (2009.01)
(52) U.S. Cl. ............... 455/466; 455/414.4; 455/419; 370/467; 709/229; 709/246
(58) Field of Classification Search ............... 455/414.4, 455/419, 466; 370/467; 709/229, 246
See application file for complete search history.

(56) References Cited

U.S. PATENT DOCUMENTS

| 5,761,673 | A | 6/1998 | Bookman et al. |
| 6,026,433 | A | 2/2000 | D'Arlach et al. |
| 6,219,680 | B1 | 4/2001 | Bernardo et al. |
| 6,891,811 | B1 | 5/2005 | Smith et al. |
| 6,912,545 | B1 * | 6/2005 | Lundy et al. ............... 1/1 |
| 2005/0208930 | A1 * | 9/2005 | Zmrzli ............... 455/414.4 |
| 2005/0235048 | A1 | 10/2005 | Costa-Requena et al. |
| 2006/0030303 | A1 | 2/2006 | Albertsson et al. |
| 2006/0040642 | A1 | 2/2006 | Boris et al. |
| 2007/0093259 | A1 * | 4/2007 | Hyatt ............... 455/466 |
| 2007/0133602 | A1 * | 6/2007 | Russell ............... 370/467 |

* cited by examiner

*Primary Examiner* — Amancio Gonzalez
(74) *Attorney, Agent, or Firm* — Temmerman Law Office; Mathew J. Temmerman

(57) ABSTRACT

A method of operating a mobile service comprising the steps of receiving a first request via the World Wide Web or WAP to create said mobile service, said first request comprising instructions to modify a mobile service template, creating said mobile service from said instructions and said template, receiving a second request to execute said mobile service, said second request comprising an access number and delivered via a text message communication device having an MSISDN, determining said mobile service from a reference table comprising said MSISDN and said access number, and executing said mobile service.

19 Claims, 6 Drawing Sheets

Application name

| Demoapp |

Select a keyword to use

| demoapp |

Select a shortcode

| 12345 ▼ |

| 12345 |
| 54321 |
| 6789788555 |

[ Cancel ] [ Next ]

Fig. 2

Chat Application (Step 2 of 2)

Application parameters

☑ Password protect ❓

Allow directed message ❓

◉ Yes ○ No

Logoff message ❓

[Thank you for using this chatroom. Welcome ba]

Usage message ❓

[To log in to the chatroom, reply with: <SCREEN]

Password for the chat room ❓

[Password]

Chatroom name ❓

[MyChat]

Screen name question ❓

[Please reply with your preferred screen name.]

2006 Prom Queen

| configuration | actions | data |

What action would you like to schedule?

Send results for selected poll

Send out action results for selected poll to participants

| 09.04.2006 ▼ |

| 09.04.2006 |
| 22.02.2006 |

| Do it! |

Fig. 4

USER GENERATED DYNAMIC MOBILE SERVICE

RELATED APPLICATION

This application claims priority from the U.S. provisional application with Ser. No. 60/836,161, which was filed on 8 Aug. 2006. The disclosure of that provisional application is incorporated herein by reference as if set out in full.

FIELD OF THE INVENTION

This invention relates to the creation and use of services for handheld communication devices or text message communication devices such as mobile telephones, and specifically relates to the template-based creation of services, to be accessed and executed via existing SMS/MMS and other mechanisms in a novel manner.

GENERAL BACKGROUND

User created content is quickly becoming a major component of modern culture, from the emergence of Youtube, Myspace, to homemade commercials appearing on the Super Bowl. One area in which user created and user generated content has not fully infiltrated is the mobile phone and text message industry.

Currently there is not a simple method for text message communication device end users to create system wide-accessible user generated content and services. Various legal, technical, and monetary barriers prevent all but large well-funded entities from creating these types of mobile services.

Methods of using templates to create web pages accessible from standard web browsers are well known. U.S. Pat. No. 5,761,673 to Bookman et al. discloses a method and apparatus for generated dynamic Web pages on a Web server by invoking and executing predefined procedural packages stored in a database. In Bookman, et al., an object request is received on by a Web server that activates a Web agent which in turn invokes and executes a predefined procedural package to retrieve data from a data repository, and format the data as HTML output. U.S. Pat. No. 6,026,433 discloses a method for creating and editing a Web site in a client-server computer network using customizable templates. The templates contain a multitude of editable objects or elements. A template is then selected upon which the new Web site will be based. The Web site with the customized elements is then published on the World Wide Web. U.S. Pat. No. 6,219,680 discloses a software tool for simplifying the creation of Web sites. The tool comprises a plurality of pre-stored templates, comprising HTML formatting code, text, fields and formulas.

None of the prior art above allows for the text message communication device based customization or execution of applications and services on the websites. Methods do exist for controlling mobile services via a text message communication device. The traditional way that a text message communication device user accesses mobile services is through a text message to a phone number specific to that service. This method is referred to as a static system. In this system, either a conventional telephone access number may be used or a "shortcode" access number. The phone number of the requester is not considered. A second traditional means for controlling mobile services via a text message communication device is through keywords associated with each access number. This method is referred to as the keyword system. For instance, to receive "Joke of the Day" texts, if one were so inclined, one might text the word "JOKE" to a specific access number. Once the text message communication device user texts the keyword to the phone number or shortcode, the mobile service associated with the keyword texted is executed.

The disadvantages to the above systems are that there is a limited number of access numbers that may be used, thereby limiting the potential of the static system. Thus, the use of the keyword system has become quite common, but this system requires additional steps on the part of user, such as remembering and successfully entering both an access number and a keyword. Additionally, the most common text message communication device, the mobile phone, typically only allows for storage of a phone number and a name associated therewith. Thus, the user would have to remember the keyword and corresponding phone number for each mobile service accessed.

One objective of the present invention is to provide a template-based simple-to-use mechanism to allow text message communication device end users to create their own individual mobile content that can be shared and accessed by others.

A further objective of the present invention is to overcome various technical and monetary obstacles to the user-creation and implementation of mobile phone services by utilizing a mobile phone carrier's current SMS and MMS infrastructure.

A still further objective of the present invention is to increase the usage of text messaging by mapping text messages to user generated content.

A still further object of the invention is to allow text message communication device users to access an increased number of mobile services without requiring a keyword-based system.

A still further objective of the present invention is to lower the level of programming skill and computer expertise required to create mobile device services.

Additional objects and advantages of the present invention will become obvious to the reader and it is intended that these objects and advantages are within the scope of the present invention.

SUMMARY OF THE INVENTION

The present invention overcomes all of the aforementioned barriers, and provides for the hosting of services by providing for users of text message communication devices a library of easy-to-use templates or scripts that let the user develop and distribute content they have created via a standard web browser. Friends, family, or the community at large via their mobile telephones' text messaging capabilities can then access this content. Types of content creatable includes games, blogs, fan clubs, school activity notices, systems to allow multiple friends/family to vote on latest trends (or anything), chats, picture taking, event planning, and daily updates, (such as jokes, horoscope, or simply where the meet up place of the day will be for a group of friends). The applicant's system allows the designer of mobile content to be nearly anyone, tapping a huge base of individuals who have already proven their creativity to the modern advertising and content creation world.

The Applicant's system provides for users of mobile Internet-accessing devices a library of easy-to-use templates or scripts that (1) let the user develop and distribute content they have created via a standard web browser, which (2) may in turn be run from a computer or web-enabled mobile phone. Friends, family, or the community at large via text messages from their mobile telephones can easily access the developed content.

To implement the content creation portion of the system, the wireless network operator or other system owner (often a wireless carrier) must install a software platform accessible on the web, WAP, or through text messaging. The application features a point and click web-based interface through which users design their own individual content and services for distribution to friends, family, and the community. No programming knowledge is required of the user. The templates range from the simple to the complex and advanced and are based on pre-defined parameters. In a preferred embodiment, the user opens the webpage, enters parameters and configures the template.

After being configured by a user, the configured template and user-entered parameters becomes a mobile service that is accessible, viewable and controllable via incoming and outgoing text messages (SMS, MMS, Picture Messaging, etc). The mobile service communicates with the users via outgoing text, picture or video messages delivered to and incoming text, picture or video messages sent from the user's text message communication device. Hence, the Applicant's system utilizes the existing messaging infrastructure currently in place by major text message communication device carriers. Since the Applicant's system leverages the mobile carriers' existing SMS/MMS infrastructure, the carriers can maximize their return on their existing assets.

Mobile carriers will benefit through implementation of the Applicant's system due to the increased use of text messaging and increased data transfer through access to the user-generated content. As the number of text and photos sent via the carrier's networks increases, so does the network's profit. Since the Applicant's system works on existing technology and current networks, there is no need for carriers to invest prohibitive sums of money to set up the system.

Additionally, it is more likely that currently subscribed customers to any given carrier will remain with the carrier if they have significant mobile services set up with that carrier.

From an end user standpoint, the Applicant's system provides an additional outlet for the user generated content market. It harmoniously blends online and mobile experiences into one.

BRIEF DESCRIPTION OF THE FIGURES

The foregoing aspects and many of the attendant advantages of the invention will become more readily appreciated as the same becomes better understood by reference to the following detailed description, when taken in conjunction with the accompanying drawings, wherein:

FIG. 2 depicts a second reference screen shot from the web based custom mobile service development program.

FIG. 4 depicts a third reference screen shot from the web based custom mobile service development program.

DETAILED DESCRIPTION OF THE INVENTION

Figure 1:
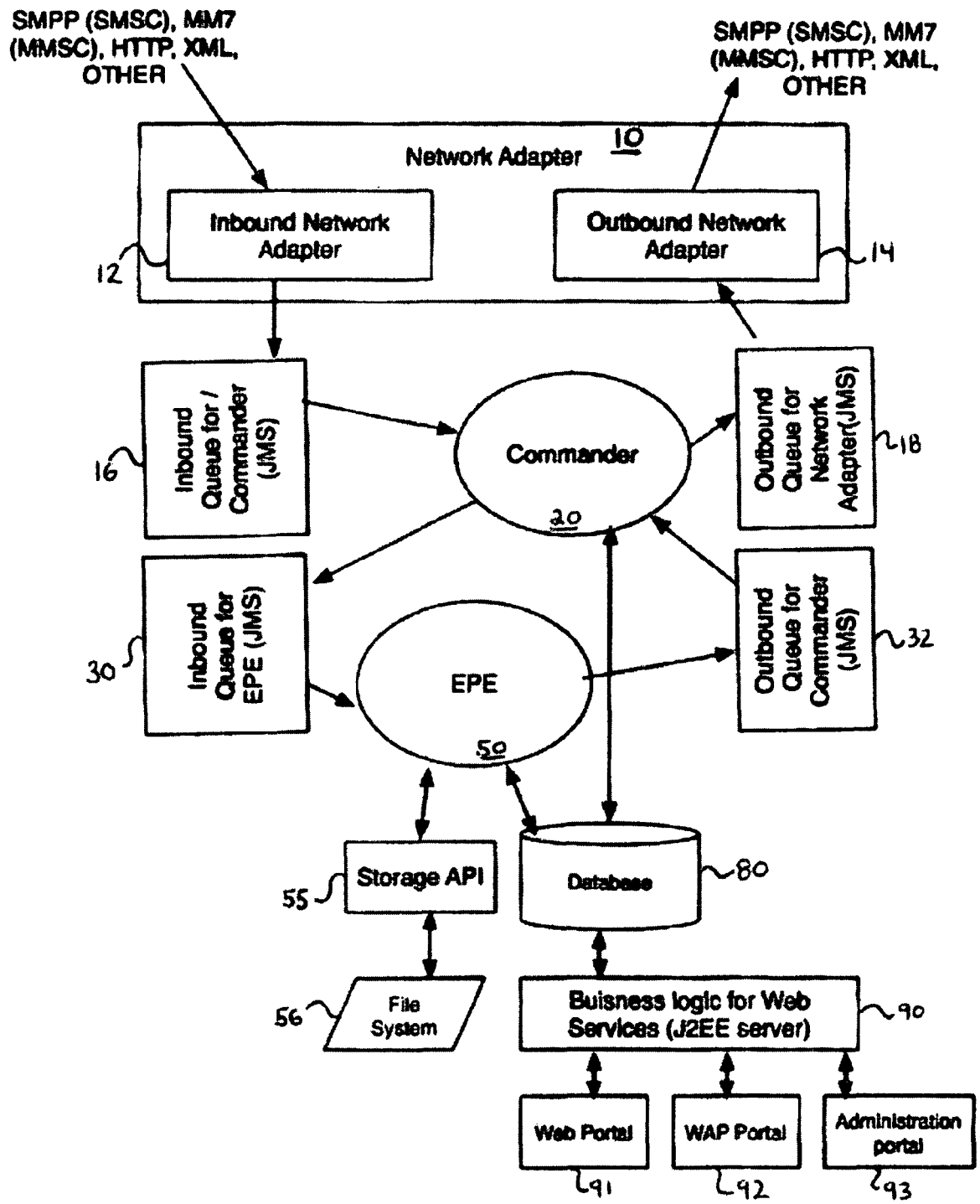
FIG. 1 depicts an overview of the applicant's system.

For purposes of this patent application, the term "user" shall refer to the end user of the handheld communication device or text message communication device. It may also refer to a user who accesses the web in order to generate content for himself or other users' text message communication devices.

Due to the recent convergence of mobile telephones, text messaging phones, and mobile-Internet accessing devices, this patent application will generally refer to text message communication devices, which almost always are both a handheld communication device and importantly, a mobile telephone. A typical list of devices, although not exhaustive, includes such devices as a mobile telephone, blackberry, pocket pc, and sidekick. Because the present invention is adaptable to a feature built in with nearly every mobile phone and carrier, the barrier of requirements for the invention's use is quite low. A more sophisticated mobile phone, with full Internet and web access, may still utilize the present invention through its text or instant messaging features.

The term "mobile service" refers to any application or service remotely accessed from a handheld communication device or text message communication device (such as a mobile phone). These mobile services are generally created via the World Wide Web or through Wireless Application Protocol (WAP). In a preferred embodiment of the invention the mobile service is viewed, operated and interacted with through text messages.

Finally, the term text messaging may refer to Short Message Service (SMS), Multimedia Messaging Service (MMS), picture messaging, or video messaging via handheld communication devices or text message communication devices (such as mobile telephones).

The Applicant's system provides for users of mobile Internet-accessing devices a library of easy-to-use templates or scripts that let the user develop and distribute content they have created via a standard web browser, which may in turn be run from a computer or web-enabled mobile phone. Friends, family, or the community at large via text messages from their mobile telephones can easily access the developed content.

This application will describe the implementation of these services and sample services that may be implemented. The first step to be described, however, is the creation of the mobile services. The services are preferably created through a software platform available on the Internet, but simplified templates with an increased number of default values can allow content creation via SMS, MMS, WAP or Picture Messaging messages.

In summary, the web-based creation offers the user a webform with parameters that are filled in on the webform by the user. In a preferred embodiment the form filling process takes places over a multipage "wizard". The WAP mobile-based creation of mobile services is simplified somewhat over the web-based creation process. Because mobile browsers tend to offer less space on the screen, fewer options are available for editing by the user. More options are filled in with default responses. The most basic of cases occurs when a user creates a mobile service via SMS. In this case, very basic options are received from a text message sent by a user, and these are collected and entered as service parameters. For instance, the text message "CREATE CHATROOM MYCHATROOM PASSWORD would simply create a chatroom with the simple password "password" required for entry. For any other customizable fields, default entries would be entered automatically. In all cases (web-based, WAP-based, and SMS-based) the parameters are stored in a database.

The platform utilizes templates consisting of several basic components, which are described below. Following this description of the components, an example of the mobile service creation process will be detailed.

A script contains the business logic of the template, i.e. instructions to run a chat or tally a vote. The script is executed according to user-customized configuration settings described below. In a preferred embodiment, the business logic accesses the configuration settings from a database. As one example, a parameter obtained from a user during the creation process may dictate whether a password is allowed for a specific chat room. More sophisticated script functions include the sending out of text messages on a weekly basis or as a function of receiving a keyword, keeping track of who is logged in, and directing functions overall. The business logic may be implemented in nearly any programming language, including but not limited to Java, C++, C#, Perl or any script language, JACL (a java implementation of TCL) is preferably used.

The configuration settings are stored in a file containing all settings. Each template has a set of configuration settings associated therewith. Various settings and rules for the template can be included as read from a file or a database. An example of a rule is one that prevents a user from entering letters in a data field designed for the input of numbers. One difference between these settings and those of the user parameters to customize the template are that the configuration settings can be systemwide settings that affect all users of the template. These may be systemwide for all users of all services, all users of certain services, certain users of all services, or certain users of certain services. The configuration settings may comprise data of nearly any type including but not limited to a number, a text string, a date, a logic value such as true/false, or a list or array of items. Each set of configuration settings defines a mobile service based on the selections of the user. Essentially, as the user accesses the template creation software either through a web browser or text message communication device, the user makes a request to base his or her content from any of the given templates. As the request is made for a certain templates, this prompts the user for a set of parameters, such as the name of the service and details on how it should function, such as what text is sent out when a user joins a chat room or what the options are in a poll. One or more of these parameters may be set to default values, especially if the user accesses this through the use of a device with limited communication options such as WAP on a mobile phone. These parameters are then later read by the system ultimately modify the mobile service.

The configuration file also defines how the graphical user interface (GUI) will be displayed to the user for entry of configuration parameters (e.g., if parameters are split on multiple pages, names of fields, links to database tables from which default values are read) by the user. The configuration file also validates the user parameters as they entered. For example, the validation may be of a number range, a valid email address, a valid phone number etc. The configuration file also contains the description, settings and constraints of all database tables utilized by a mobile service. For instance, the definition of a table to store a distribution list for a distribution list mobile service would be stored here. Finally, the ways in which the user may interact with the template creation software are stored here. For instance, certain actions may require parameters such as a date or email address. Data in the configuration file would instruct the GUI to instruct the user to select a date.

The configuration file may also have additional instructions and settings specific to each template. If for instance, in one template voting data was going to be sent on a certain date, the configuration file would instruct the GUI to give the user the choice to enter a date. See FIG. 4. The configuration file also has instructional data to trigger the service to transmit poll results on that date.

The user interacts with a GUI that is based on a custom page file holding advanced display settings. While normally the system can autogenerate forms for the GUI based on information needed for the configuration settings, the option of greater flexibility is present through the use of custom page files. These can generate completely customized pages (such as Flash based, or themed) if a unique user experience is required. Other customized features may include the ability to drag and drop various components, and features such as the ability to incorporate facebook importation features. In general the purpose of custom page files are to allow additional flexibility to add functionality not covered by the automated creation of pages based on the parameters defined in the configuration file.

The configuration settings are mapped to database tables. The tables may be any medium of storing data electronically including, but not limited to, text files, XML files, spreadsheets and databases. The database tables are created for any specific template to store data, and hold data for all instances of the template in question, i.e., for every service a user makes, some or all of these tables will have data inserted in them. Each mobile service has a table in the database. Examples of items stored include who is logged in at any time, who is in a chat room at any time, authentication and security methods to ensure proper parameters have been entered, and messages to be sent out a later date to a distribution list such as a reminder invitation to an event.

The template may also include a number of template assets, including but not limited to pictures, video, fonts, and audio files. These are shown or interacted with during service creation and maintenance.

Figure 3:
FIG. 3 depicts a second reference screen shot from the web based custom mobile service development program.

As an example of the process a user would undertake to create a mobile service, the following description applies. The user will interact with a GUI, which displays screens to the user based on the data in the configuration settings. FIGS. 2-4 provide a sample of screenshots the user may encounter according to a preferred embodiment of the invention on the World Wide Web. Only three screenshots are shown, but many more could be used. FIG. 2 depicts the screenshot of a user who has named a service "Demoapp", and assigned a keyword "demoapp" to the service. The user has selected the shortcode 12345 (described in further detail below) to be assigned to the service. FIG. 3 shows a user assigning various service parameters to the service. In FIG. 4, the user is selecting a date on which poll results from a polling mobile service will be sent. Although in a preferred embodiment of the invention, the GUI is accessed on the Internet through a web browser, it may in an alternative embodiment of the invention be simplified to a text interface accessible through text messaging services on handheld communication device or text message communication device such as mobile phones. The user fills out configuration parameters that are subsequently stored in the database tables specified by the template configuration settings. Fields are validated and default values are automatically entered based on the configuration settings. After following prompts shown in the GUI, the user finalizes the process and at that point a mobile service has been created. Next, the business logic is activated either as a program itself or it is loaded from a parser or similar container. The configuration parameters are retrieved, which guides the operation of the service and business logic script.

After the mobile service is created, it must be accessible to text message communication devices. Through the use of scripts, an event-processing engine (EPE) uses the parameters in an incoming message (sent preferably by a user via text), allowing programmatic functionality of the user-generated content. The EPE may create outbound messages if needed, and may also access other resources such as RSS feeds, databases and webservices. Because mobile services will ultimately be mapped to each user as described below, large numbers of access numbers and keywords are no longer a requirement.

During the mobile services creation process, the templates may in an alternative embodiment of the invention offer the service creator the option of charging for their use. This charge may vary from as low as nothing to any amount desired. Additionally, the carrier may choose to charge a fee for the use of any service, regardless of creator.

The method through which the mobile services are mapped to the users will now be described. In conventional static systems, one access number will always open the same service, regardless of the sender. Hence, huge quantities of access numbers are required if the user is to have a large selection from which to choose. In a conventional keyword system, numerous services are associated with one shortcode by requiring the user to provide a keyword that allows the conventional system to ascertain which service the user is trying to access. As an example a user may send the text 'joke' to a shortcode 12345 to sign up for a mobile service relating to jokes. In this case 'joke' functions as the keyword.

The applicant's method involves setting up a mobile service reference table for each user, the reference table comprising access numbers and the mobile services to which they are associated for that user. As above, the access numbers may be a conventional telephone number or shortcode. Unlike the above, the access numbers may also be another identifier such as an instant messenger ID or an email address. The table may be maintained through the web or through messages sent through the text message communication device, through a service running on the handset, or any other means the user has of modifying the table. An example of such a table is shown below in Table 1 for a sample user:

TABLE 1

Mikael's Mobile Service Reference Table

| Access Number | Mobile Service |
| --- | --- |
| 404-111-1234 | Application I.D. 45 |
| 1001 | Application I.D. 89 |
| 10200 | Application I.D. 75 |
| 1002 | Application I.D. 21 |

Collectively, one table can display all users and all access numbers for each user, as well as the mobile service associated with those access numbers, as shown below in Table 2.

TABLE 2

All Users Mobile Service Reference Table

| User | Access Number | Mobile service |
| --- | --- | --- |
| Mikael | 1001 | Application I.D. 89 |
| Mikael | 1002 | Application I.D. 21 |
| Mathew | 406-555-1532 | Application I.D. 89 |
| Christina | 1002 | Application I.D. 47 |
| Nikolaj | 1002 | Application I.D. 89 |

In the above table it is noted that there is no correlation between access number and mobile service, unless the user is taken into account. Thus, the same access number used by different users may lead to the execution of different mobile services. Similarly, the same mobile services may be accessed and executed through the use of different access numbers by different users. This is important because there are myriad mobile services available, and most users are likely to select their few favorites to add to their mobile service reference table. They must thus assign their favorite mobile services to simple shortcodes such as 1001.

In a preferred embodiment of the invention, the following steps occur as the user of a text message communication device sends a text to an access number listed in table 2 above.

First, the MSISDN of the sender is identified. Generally the MSISDN is simply the user's telephone number.

Second, the particular access number (either a phone number, shortcode, instant messenger ID, email address, or other identifier) used by the user is identified and cross-referenced to a service on the table and the service is then activated. Generally, the user will have also sent a command to the service so that the service performs the desired function of the user.

Third, if the access number sent by the user does not match up to a service associated with that user (i.e. the user has not yet added the service), the system will attempt to identify the service through a commercial directory much like what occurs in the conventional static based and keyword based systems.

To send a message to each user of a service, the process is reversed. In the reverse, the system determines which access number the user receiving a message has associated with the service and sends the message from this access number. If the user has not mapped an access number, then a default access number for the service would be used.

The advantages to the applicant's system are that one access number can be used for many different services by many different users. This is because the service is specifically associated to a phone number for the user, and is not generically set up for millions of users across the world. One access number could mean a different service is accessed for each of ten users using the same access number. Hence, the use of keywords is not necessary using the system. An additional advantage is that a service may be utilized through the current conventional phonebook found on conventional text message communication devices. That is, the drawback of the keyword system—namely that keywords cannot normally be saved alongside numbers—is eliminated.

Now that the basic means through which a mobile telephone user accesses a mobile service have been disclosed, further details implementation of the Applicant's system will be described.

Referring now to FIG. 1, an overview of a system to implement the invention is shown. A network adapter 10 is depicted, which in a preferred embodiment may be a multimedia messaging service center (MMSC) network adapter or a short message service center (SMSC) network adapter, various other types of network adapters could be used. In a preferred embodiment, most requests sent to the system are submitted asynchronously, e.g. through JMS, in order to improve scalability and throughput. However, this is not a requirement, and it is possible to create input adapters that receive requests through other channels e.g. web services, XML, HTTP database table interfaces and RPC calls.

The system comprises both an inbound network adapter 12 and an outbound network adapter 14. The MMSC network adapter handles incoming and outgoing MMSs as well as any binaries contained in the MMS. The SMSC network adapters implement SMPP (short message peer-to-peer protocol) for handling incoming and outgoing SMSs. These devices are well known in the text message communication device carrier field and can be easily integrated into the Applicant's system using network adapters common in the art. Messages and user requests may come into the system through a wide variety of means and it is the inbound network adapter 12 that handles and transforms them to an internal message format used within Applicant's system.

The internal message format is the internal representation of a message within the Applicant's system. Every incoming message that causes a script to be called is allocated a unique transaction ID that makes it possible to link all messages generated as part of the transaction. This ID is stored together with billing and logging data. The system handles both simple text messages (e.g. SMS) as well as more complex messages with multimedia content, such as MMS. The inbound network adapter 12 is also responsible for parsing each quest and storing in a file system 56 (connecting lines not shown) any multimedia content it contains. After the content is placed in the content storage, it will be signified as such with a tag identifying the location of the content that can be later accessed throughout the remaining processes of the service. If the content is to be later sent out via a message, then it is recognized by its tag in content storage, retrieved from content storage, and added to the outbound message by outbound network adapter 14. After the content is removed, the internal message continues on.

The message next enters an inbound queue for commander 16, which acts as the buffer for incoming events. As messages leave the system through the commander, they enter a similar buffer, outbound queue for network adapter 18. Both outbound queues may be implemented in Java platform, Enterprise Edition (J2EE) and preferably runs on an Enterprise level Application Server (BEA WebLogic), which provides scalability. Thus, although JMS is preferred, any message queuing system may perform this function. The internally formatted message is then handed to the commander 20 for further processing Continuing with FIG. 1, as the message leaves the inbound queue for commander 16 and enters commander 20, which, looks up the service to which the message should be directed. This may occur with communications with a database 80. As described above, the service to which the commander determines to route the message is dependent on the access number used (in a traditional static system), the access and keyword used (in a traditional keyword system) or dynamically according to the present invention.

From the commander, the message then enters the inbound queue for EPE 30. This may in fact be a queue internally similar to inbound queue for commander 16, that is, it may be implemented in Java platform, Enterprise Edition (J2EE) and preferably runs on an Enterprise level Application Server (BEA WebLogic), which provides scalability. Thus, although JMS is preferred, any message queuing system may perform this function. Just as there is an outbound queue for network adapter 18, there is an outbound queue for commander 32, which again may be implemented in Java platform, Enterprise Edition (J2EE) and preferably runs on an Enterprise level Application Server (BEA WebLogic), which provides scalability.

The event processing engine (EPE) 50 is crucial to the Applicant's system. In actuality there may be multiple EPEs (not shown), each corresponding to numerous mobile services. Instructions from the commander 20 direct the internally formatted message to the proper EPE, which then executes the mobile service corresponding to the instructions from the commander 20. Once there, the message is redirected to the particular mobile service that is to be executed. Either the mobile service is already in memory or it will be loaded into memory.

EPE 50 processes the event according to the definition given by the mobile service and sender/received setting and restrictions and filters, and puts outgoing events back on the outbound queue for commander 32. Like commander 20, the EPE 50 has a connection to database 80 from which it retrieves (and caches) relevant data like configuration parameters and carrier and user restrictions, filters, etc. In a preferred embodiment, the EPE 50 is implemented in J2EE and is running on an Enterprise level Application Server, which provides scalability and failover.

Database 80 is the persistent storage in the Applicant's system. It may be accessed by EPE 50 or through a business logic for web services module 90, which provides the business logic for a web portal 91, WAP portal 92, and carrier administration portal 93. Through portals 91-93, changes may made to the database that are reflected throughout the system. Business logic for web services module 90 is preferably J2EE as well. This module will store data in the main database and runs on an enterprise level application server offering scalability and failover.

Optionally, a mobile phone carrier may utilize the web portal 91 or WAP portal 91 running on a scalable application server, which may require a load balancer in front to ensure events are appropriately routed. Portals 91 and 92 may be branded and operated by the text message communication device carrier and generally serves the purpose to offer users a place to sign up for an account to use the Applicant's system on the carrier's network, to allow users to login to manage their account, to display advertisements to the users, and to display interesting other materials such as the most popular or highest rated user generated mobile services etc. Since in a preferred embodiment this will be displayed to the user in the form of a web page, any number of different components commonly found on web pages could be added.

The mobile phone carrier may have an interest in administrating various functions of the system. There is thus an optional carrier administration portal 93 that runs in a secure environment in the OSS/BSS and provides for the mobile telephone carrier a means through which it can manage users and mobile services such as by blacklisting certain users, deleting certain services, white listing certain users, filtering, censoring certain words or users, and other policing matters in the case of users creating infinite loops or attempting to spam.

Figure 5:
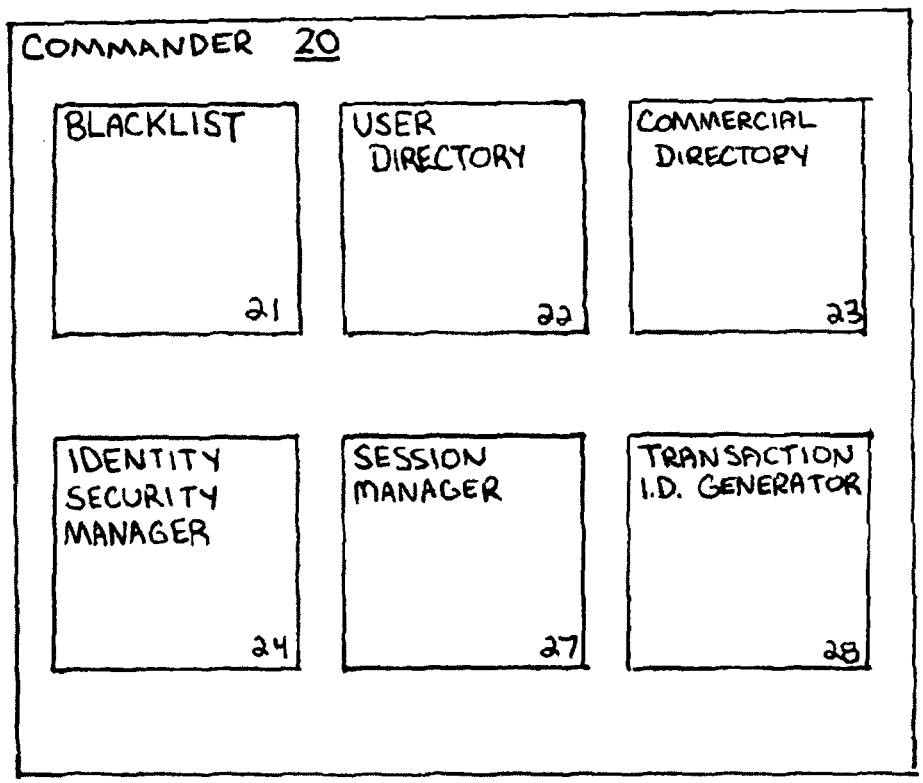
FIG. 5 depicts a simple class diagram depicting the structure of the commander.

The commander 20 is depicted in greater detail in FIG. 5, which shows a simple class diagram depicting the components of the commander. Referring to the various components in FIG. 5 in detail, a blacklist 21 is used to prevent certain users from accessing certain or all services—either voluntarily or involuntarily. Preferably, when before a message is sent out from the system, the blacklist 21 will verify that the recipient can receive the message. If the recipient cannot, the message is not sent out. The blacklist 21 must be flexible enough to: (1) prevent users from other networks from using certain types or classes of services that are only available to home network users, (2) restrict individual user's access to all or a subset of all services (this feature can be used as a parental control or to allow the system administrator to block users that abuse the system), (3), restrict the access of users within the home network to certain service or types of services that are considered premium content, and (4) prevent certain messages from being sent out to users who are not allowed to use the service.

The blacklist 21 must allow services to be grouped into different classes in order to make them easier to manage. Every entry in the blacklist 21 should be linked to a reason code that allows the system sending automatically returning a message stating the reason why the request was denied to the user making the request. The system administrator through the system administration GUI will maintain the blacklist 21, but it should also be possible for users to block access through the User Portal for a specific number so it can be used for parental control. Since every request is checked against the blacklist it is important that it is optimized for performance. It must be designed to scale and perform well across a cluster. As an example a user could 'blacklist' herself from a service to avoid messages and later remove this restriction; or an owner of a service could remove troublesome users.

Each event may optionally be checked against a white list (not shown) and/or a word filter. The white list is managed by the administrator or owner of the mobile service and comprises a list of mobile users who are allowed to use the service. Only events from users in the white list are processed further. In some cases, the owner or administrator may choose to not have a white list, in which case all events are forwarded to the script. The blacklist has priority over the white list—that is—if a user is on both lists, then the event from that user will be blocked.

As described previously, every user of the Applicant's system has a configurable number of access numbers to which he/she may link selected services. This data is stored in a user directory 22. See FIG. 5. Additional access numbers may be added to the user's account as part of separate feature packages. This allows the text message communication device carrier to provide the users with varying level of service based on for instance subscription types or additionally purchased packages, plans and services. The user directory 22 is also accessible through portals 91-93 (see FIG. 1) that allow the user or administrator to link services for a user to an access code of choice. Finally, the user may be able to add to his or her mobile reference table through the use of conventional static or keyword systems. The user's table will persist until changed and can therefore be stored in the phone book of a mobile phone to provide easy access to the selected services, if the user is in fact using a mobile phone. Thus, there are several ways a user can edit his or her mobile service reference table.

Continuing on with FIG. 5, a commercial directory 23 contains all services where the service developer has chosen to link the service to a single access number or alternatively an access number plus a keyword so that users that have not created a user directory entry for the service can access the service. The system will check if a potential keyword can be found in the request and submit this together with the access code used to the commercial in order to identify the service to which to rout the request.

An identity security manager 24 is present to provide security to the system. Since an MSISDN can reside in any number of mobile service member lists, protecting user identities from the malicious is of utmost importance. In order to accomplish this protection, all identifiers (such as MSISDN) that are passed to scripts may first be encoded, encrypted or hashed and then decoded afterwards by the scripts. Since the service scripts must be able to identify users by this encoded identifier, any identifier must always be encoded and decoded the same way when sent to a specific service. However, the encoding algorithm used may differ between services. The identity security manager 26 thus contains encrypted versions of phone numbers so that they may remain secure in the database. These encrypted numbers can be used to communicate internally without fear that a number could be grabbed and used for spam or other misuse.

A session manager 27 keeps track of user session state for stateful services. It is called for as a part of every request to a stateful service and will provide the commander 20 with information about whether a specific user is logged into a session or not for a specific service. It will also keep track of when each user last used the service. Finally, it can be used to identify users who have timed out and have an automatic log off status generated. The session manager 27 keeps only state and no variables or other data. Since it will be called for in a large number of requests, the session manager 27 preferably is optimized and designed to provide good performance and scalability across a cluster.

As indicated above, a transaction ID generator 24 allows every incoming message that causes a script to be called to be allocated a unique transaction ID that makes it possible to link all messages generated as part of the transaction. The unique transaction ID is stored together with billing and logging data. Optimizing performance of the transaction ID generator 24 is vital since it is called frequently. It must also ensure that unique IDs are generated across a cluster. A preferred method of achieving this is to base the transaction ID generator 24 on a database sequence and have the component concatenate this with an internally generated key that allows the component to create a sufficiently large number of unique IDs before having to get another sequence value from the database.

Collectively, the components function as follows. First, commander 20 fetches the next event/message coming from the inbound queue for commander 16. It next checks the blacklist to see if this message is prohibited for any reason, such as the recipient opting out from receiving the message or the sender being blocked. The commander then locates the correct application I.D. from the user directory 22. If the user has not mapped an application to the access number, the commander will attempt to retrieve it from commercial directory 23. In the even both these lookups fail, an error is reported and the process is done. If either of these lookups succeed, the commander will locate the correct Event Processing Engine (not shown in FIG. 5) to process the event/message. It will then proceed to update a billing handler 63 (subsequently described, and shown on FIG. 7), and identity security manager 24 will encode the MSISDN for privacy reasons. Finally, a check is made to determine if the service has a state or not. If there is a state, then session manager 27 is invoked to retrieve the state. Finally, and as shown in FIG. 1, the message/event is passed to inbound queue for EPE 30.

Figure 6:
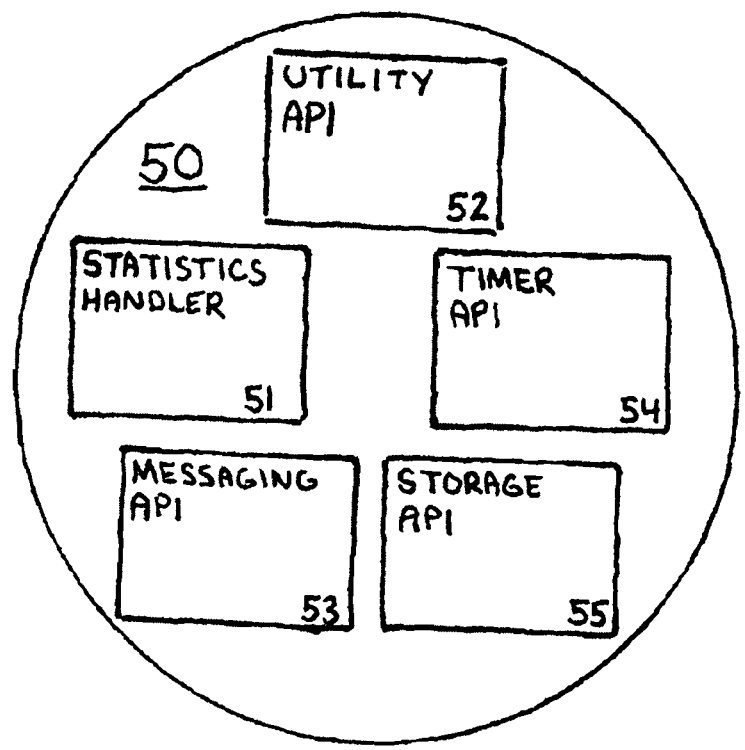
FIG. 6 depicts the event processor engine in detail.

Turning now to FIG. 6, the EPE 50 is shown in detail. As described previously, EPE 50 executes the mobile services with the necessary parameters and generates outbound messages.

A statistics handler 51 is responsible for gathering and organizing statistics from the system. The EPE will call the statistics handler 51 in order to record how much time the execution of a specific method for a specific service has taken. This will be done for every call and needs to be aggregated periodically in order to be manageable. The system must ensure that enough detail is stored to allow system administrators to identify services that are performing poorly and therefore are using large amounts of system resources.

A utility API 52 contains a wide array of functions that are useful when developing mobile services, and are used during the execution of many mobile services. The utility API 52 includes but is not limited to a random number generator, functions for string and text manipulation/comparison, functions for date and timestamp manipulation/formatting, functions for manipulation and formatting of numeric values, and functions for management and manipulation of collections.

A messaging API 53 has functionality for handling, creating and sending messages of all types. When adding content or multimedia to a new message, the messaging API 51 interacts with the a storage API 55 and the file system 56 (see FIG. 1) to validate existence and type of the content so the message can be assembled correctly.

A timer API 54 is a service script to set countdown timers and alarms at specific dates and times that generate events. When a timer or an alarm is triggered, a specific event with a configurable event message is generated by the system and is sent to the commander, which calls the appropriate service through the EPE 50.

The storage API 55 is a set of functions that allow the mobile service to read and store data through a uniform method to and from a file system. This abstracts the actual storage medium from the functionality of the script, thus allowing multiple storage media such as databases, file systems, in memory-caches or other methods of persistently storing data for later retrieval. This also allows for controlling or limiting data stored in a central place as opposed to in each individual script.

After EPE 50 processes the message, a variety of events may occur. For instance, the event could be a request from a user to not receive any further messages from the mobile service. In this case, the user may have texted 1212 BLOCK, which would command EPE 50 to add that particular user to the blacklist for the mobile service associated with that number for that user. The user may unblock himself or herself at a later time. The script processing created by the user for the mobile service may have checks built into it to monitor for items such as maximum execution time, endless loops, spamming, memory usage caps, database usage caps, and file system usage caps. The mobile carrier may implement reserved words that have special meaning to the script.

The following section describes all memory structures available from EPE script processing in the mobile service.

Session parameters keep the program state between events, but however, are not written to disk. When the mobile service is removed from memory the state of the parameters is lost. To make parameters a generic feature of any mobile service, the applicant's script has available a list of Booleans, a list of dates, a list of strings, a list of integers, and a list of floats. The exact number available in each list is determined by the user's profile.

The Session Active Member List is a system wide provided memory-only list/structure whose purpose is to be a placeholder for current members of a mobile service session. Fields in a member list entry may be but are not limited to the member MSISDNs and member names. If a mobile service uses the session member list, it provides several advantages. First, It provides an easy to use system-provided list with standard access methods for adding and deleting members. Second, no user tables are needed. Third, the list is kept in memory only, hence, no disk access is needed. Fourth, the mobile carrier will be able to view all members of current sessions, which will be ordinarily be more difficult to observe if these member lists were stored in custom service reference tables. Fifth, when sending messages, standard methods will be available to send e.g. a message to the whole list as opposed to have logic inside the script to extract the members from a custom list. Not all mobile services will likely use the session member list, and the maximum number of allowed entries in the list is assigned in the user profile. When a mobile service is removed from memory the state of the session member list is lost.

The persistent member list is the persistent counterpart to the session member list. Custom made mobile service owners may use this to store the subscribers to the mobile service. Typical fields in the persistent member list are member MSISDN and member names. The persistent member list provides many advantages over not having one master list. First, it provides an easy to use system-provided list with standard access methods for adding and deleting members. No user tables are needed. Second, it allows the mobile carrier to view and create statistics on all users, which would be difficult if this information were stored in each user's custom service reference table. Third, when sending messages, standard methods will be available to send e.g. a message to the whole list as opposed to have logic inside the script to extract the members from a custom list. Fourth, the max number of entries allowed can be set in the profile to limit the number of maximum potential members on any given service.

A scheduler allows for the delay of execution of events. For instance, one problem may occur when a user is sending out a daily message to her friends. In the event there is a five-day delay, the scheduler may catch up and send the same message five times. By using the date of the schedule, this repeated sending of messages that failed to promptly deliver is avoided.

Figure 7:
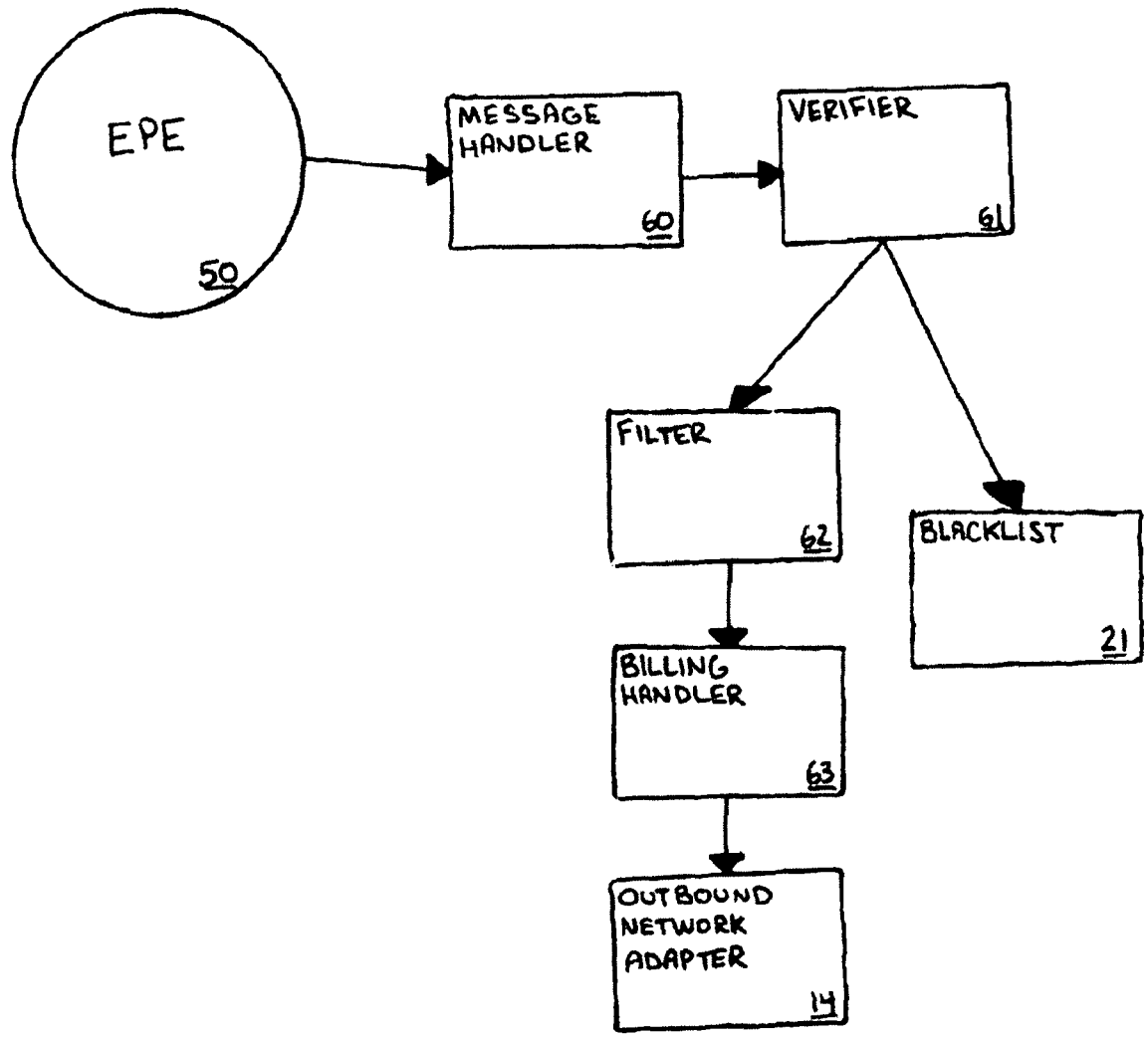
FIG. 7 depicts in detail the processes surrounding the message handler.

Upon completion of processing, all internally formatted messages are routed through message handler 60, which also provides the interface through which all outgoing messages are handled. Referring now to FIG. 7, the outward routed messages take is diagrammed. First, all messages come in asynchronously preferably through JMS and even though there may be multiple messages related to the same transaction, all outbound messages are processed individually. When processing an outbound message, the message handler 60 first checks with the verifier 61, may or may not consult blacklist 21 to see if the message is to be sent out. If the message passes this test it is sent to the filter 62 for evaluation. Once these validation steps have successfully been carried out, the message is passed to a billing handler 63 in order to generate the appropriate billing details for external systems. It is also here that it is confirmed that the user has the necessary account balance to perform the function. This may be maintained internally in a balance manager or an external manager may be queried for authentication to send out a message. It is then finally handed over to the appropriate outbound network adapter 14, which formats the message and sends it to its correct destination.

Continuing with FIG. 7 and describing message handler 60 in further detail, the verifier 61 is called by message handler 60 in order to verify that the message may be sent out. The verifier can be configured to check with the blacklist 21 as to whether a recipient may receive a message or not. It is also possible to use a customized plug-in that can be used to check with external systems. This makes it possible to prevent messages to be sent out to users who have exceeded their limit or balance, just as has been described in reference to billing handler 63.

The outgoing message filter 62 allows the operator to define filters that filter the text in messages being sent out and can cancel any flagged text and file a report if they contain inappropriate content. Filter 62 is flexible and configurable, and must be able to define different filters for different types of services. Filter 62 may also be used to scan data being uploaded as reference data for a service.

Billing handler 63 is responsible for providing external systems, e.g. the billing system, with information about incoming and outgoing requests. This information contains service information as well as information related to the actual requests and can be used for billing. This component should be flexible and configurable so that any parameters required by external systems can be passed on. Billing handler 63 sends data through outbound network adapter 14, which is responsible for formatting and delivering the data. In an alternative embodiment of the invention, billing handler 63 is more complex and has the capability to transfer data regarding the owner of a mobile service to the carrier so carrier-determining billing practices may be implemented. Billing handler 63 may also send data to the Applicant's system regarding blocking or unblocking users or mobile service due to unpaid bills etc. Balance management and invoicing practices common in the art may be provided as well.

Outbound network adapter 14 is responsible for converting the internal message format and billing data to formats acceptable by external systems as well as ensuring the intended recipient receives the message. A number of standard output adapters exist, but new and specialized ones can be developed as part of system integration in order to support any required interface. The message can also stay internal to the system, as in total by the cyclical arrows in FIG. 1, or the messages may leave the system to other channels e.g. web services, XML, HTTP database table interfaces and RPC calls.

Additional detail will now be provided with regard to the Applicant's customization of JACL in a preferred embodiment of the invention. This description will apply to the types of customizations that would need to be made to other computer languages, if they were to be used in place of JACL. Although JACL can be integrated into various components of the Applicant's system, the following describes its implementation into the system's business logic. Typical JACL systems provide basic programmatic features like variables, conditional statements (if, then, else) and loop mechanisms. However, in Applicant's system, JACL must also control access to databases, file system and various utilities in memory, and must manage certain methods (purpose, business logic, signature, return values, exception handling etc.), available memory structures, available database structures, and must handle transactions.

The following section of this application will list several of the potential custom mobile services that may be used and created. Samples detailing the capabilities and various implementations of user created mobile services are provided. While a full listing would only be limited by the creativity of the authors behind the services, the following provides an overview of some potentially popular types that may be developed.

For most of the services described below, procedures may be implemented to restrict access to the services. For instance, user access may only be allowed if a password is sent along with the access number to the service in question. For these services, the user would be granted access through sending the appropriate password to the phone number or access number through traditional text messaging. For other programs, such as chat programs, the user may be able to enter a personalized login name and password via traditional text messaging. Varying levels of access may also be granted to the mobile services. For instance, a service could be created to allow public access (that is, anyone can use it), access only to a certain buddy group typically comprising the user's friends, or access only to individually identified users.

Chat rooms are likely to be one such popular service. In the applicant's system, a chat room is a group of mobile users that are sending messages to all other users in the chat. That is, as each user responds, his or her response is sent out to all the other members of the chat room in near real time. In addition other commands can be sent to the chatroom to return information such as names of other participants. A chat room needs session management to enable the service owner (or allowed members) to dynamically open and close the chat room and to provide for a flexible way of having (allowed) mobile users join and leave a chat room. Session management is provided for in each individual service's script requiring such functionality.

In a preferred embodiment of the invention, a chat room could be opened when the user texts a command (such as "OPEN") to his or her access number corresponding to the service. The service will first verify that the message sender is on the white list for the service. Other users may enter by texting a join command (such as "JOIN" to either the service's default access number or to the access number to which this user has mapped this specific service. In an alternative embodiment of the invention, the first user to send a message with join command may open the chat room and subsequent users texting the join command would join the now-open chat session. In both scenarios, to be able to detect duplicate session start events the service would preferably provide a set of parameters that would display the state of the chat session. One of these parameters could be set to true indicating that session has started.

When the open or join command is received, the name of the user sending the message is stored in a session member list. Prior to this step the white list is checked to confirm that the user is allowed to join.

Closing the chat session is preferably as simple as sending a text of the word CLOSE to the proper access number. A white list would confirm that the user is allowed to close the session. If a parameter indicating the session was open had been set to true as described above, it would not be changed to false. If the CLOSE event is not sent to the mobile service before the service times out, then all members off the chatroom are notified that the chatroom is closing, then the service is removed from memory and erased from the session member list and the chat room is considered closed.

Messages sent to a chat room service when the chat room is not open must be also be handled by the script. The creator of the chat room mobile service would preferably have a list of choices that may occur in such a situation. One script could automate the sending of a reply that the chat room is currently not open along with instructions on how to open it. Another could be to simply discard the message. Out-of-session messages sent to a closed chat room and if still in memory will preferably prolong the time until the mobile service is removed from memory.

It should be noted that a chat session is different from a chat service residing in memory. Even after the session has been closed, the mobile service may still reside in memory. In fact, it may be advantageous not to remove the service from memory immediately after use. Not removing the service immediately can allow faster access in the future because the service would not have to be reloaded. Preferably, the service would be removed from memory after a set amount of time has expired.

As a second example mobile service program, a distribution list can be perceived as a permanent chat room. At any time when a message is sent to the distribution list it is forwarded to all members of the distribution list. The distribution list does not utilize the concept of a session. It is considered open once the mobile service has been activated and closed once the service has been deactivated or removed from memory. There are several ways a mobile user may join a distribution list. First, the mobile service owner may add the user manually during the mobile service creation process. In this method, the MSISDN (typically the phone number) of the user to be added is added to the persistent member list for that specific mobile service. Second, the mobile user may send a message to the phone number associated with the service for that user. For instance, if for this user the phone number 1234 is associated with the service, then the user may text the word "JOIN" to 1234 in order to join. To leave this list, the user may then text a leave command "such as "LEAVE") to 1234.

When a user enters the distribution list for the first time, the list of members is loaded into memory. If a new member joins while the service is in memory, the updated member list is written into both the memory of the particular mobile service currently in use as well as the database tables associated with the template for that service. If a server crashes or restarts for any reason, a new request sent to any other server will access the newly updated database containing the new information regarding the new member just joining. The distribution list does not have to be closed. It will be removed from the memory after a certain timeout period after last message. It can later be recalled from the database.

Subscription based mobile services are third example set of services wherein mobile users can sign up to periodically receive messages. Some examples include but are not limited to a daily pregnancy journal, joke of the day, wallpaper of the day, ring tone of the day, weekly astrological news, trivia (local sports, college/school, group), daily menu planners, voting, faith-based daily affirmation, celebrity whereabouts updates, etc. For any of these, a preferred method through which a user subscribes is simply sending a join command to the user's access number for the service. For instance, if the service had the access number 1234 for that user, the user may text the word "subscribe" to 1234. Likewise, to stop the subscription, the user may text the word "unsubscribe" to the number 1234. For services accessible via convention default universal access numbers, the user may subscribe and unsubscribe by sending similar messages to the default access number.

The subscription template does not need a session concept, but registers users in the persistent member list. When and how often a message is sent out may vary. For instance, they may be sent out hourly, on a certain hour, daily, certain calendar days, weekly, monthly, etc at the direction of the mobile service creator. The template could for instance also allow each individual subscriber to select what time of day they wish to receive their message. Time zone differences may be considered. Finally, subscription based service (and other services as well) may employ the use of a schedule. The schedule can monitor calendars and other schedules and trigger events sent to the program's script at certain times.

As a fourth example, menu based services may require sequential session communication. An example of a session lifecycle in this case may have the lifecycle starting when the mobile service receives a specific initiation message, and may end by from a special message or from a timeout following a message. As an example consider a restaurant offering information to a mobile phone. The initial message through which the user contacts the information server (menu based service) would set up a session and return a list of options. Such options could be 1. Directions 2. Menu 3. Special. The user would then reply with, for instance, '1' and get a new message back with directions. This menu system can be multi level with more options and even include picture or video clips.

Another type of program that may be created allows for a carrier-based community connected services for the carrier's users to come together. This community could features such as user profiles, buddy lists, a form of leaving messages in other buddies' private spaces (wall posting), a rating system for rating buddies or for rating mobile services, and an invitation means for inviting users who are not currently a part of the community. These (as well as potential all) services may be connected to popular social networking sites such as Facebook and Myspace. A recent addition to Facebook, for example, allows for Facebook services. Through input and output adapter described above, messages could be relayed into and out of these services from the applicant's system.

Request and response based services would be akin to a user driven and voted on American Idol style contest. Here, the system allows users to create and upload content, which would then be viewed and voted on by other users. This type of service could generate significant data traffic for the mobile carriers. Preferably, original user content is voted on.

A Butler mobile service could be used to block a group of users, list your mobile services, to automatically unsubscribe a user from certain services, to post an automated blog on a webpage or mobile service, or even to provide an automated help service.

A Points-based service would work with other services to give each user a point balance that can increase if the user directly or indirectly causes more users to text message. Furthermore, points could be awarded to the user for inviting other users to the service. The points are helpful for the carrier because the carrier typically charges user per text message, and the carrier would earn more if more users were texting more often. For some carriers, and in most of Europe, inbound texts are offered free from the carriers. In these systems, points could be deducted or not awarded for incoming messages to automatically regulate the flow of messages in the carrier's financial favor. Points could be used by the user for status and recognition or for use as payment for various prizes, services or other forms of content such as ringtones, wallpapers or games.

Other potential mobile services that may be created and used include comparison pricing, local bands information, video scavenger hunt, fantasy sports—player trading with instant updates, dream analysis, hypochondriac's self-diagnosis tool, national security status, airports screening wait times, pollen counts, mixology, pick up lines—the good, the bad, the ugly, jokes, riddles, quotes of the day, mobile blog, church bulletins, school scheduling, magic eight ball, interactive news reporting, racetrack odds, notification services, e.g. snow days etc., baby name generator, gift recommendation service, reminder service, dear Abby style advice services—solicit multiple responses, stain removal advice, almanac excerpts, this date in history, medication reminder, TIVO reminders, TV chat, virtual pet, drinking games, spin the bottle, truth or dare, yellow pages, interactive mapping, business calendars, business expense report programs, recipe point.

With respect to the above description then, it is to be realized that the disclosed components may be modified in certain ways while still producing the same result claimed by the Applicant. Such variations are deemed readily apparent and obvious to one skilled in the art, and all equivalents to those illustrated in the Figures and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

I claim:

1. A method of operating a mobile service comprising the steps of:
   (a) receiving a first request via the World Wide Web or WAP to create a first mobile service, said first request comprising instructions to modify a mobile service template;
   (b) creating said first mobile service from said instructions and said template;
   (c) receiving a second request to execute said first mobile service, said second request to execute delivered via a text message sent from a first user's text message communication device to a server wherein said server is adapted to communicate with said text message communication device;
   (d) executing said first mobile service to generate data;
   (e) sending said data via text message to a second user's text message communication device;
   (f) providing a reference table for said user, said reference table comprising access numbers and mobile service labels associated therewith;
   (g) wherein said second request to execute comprises at least one of said access numbers;
   (h) determining the MSISDN of said text message communication device;
   (i) determining a second mobile service to execute from said reference table; and
   (j) executing said second mobile service.

2. The method of claim 1 further comprising the step of receiving a third request to customize said first mobile service, said third request to customize delivered via said text message communication device.

3. The method of claim 2 further comprising:
   (a) customizing said first mobile service based on said third request to customize; and
   (b) sending a mobile service generated response to said text message communication device, wherein said sending step occurs subsequent to said receiving a third request to customize step.

4. The method of claim 1 wherein said text message communication device comprises a mobile telephone.

5. The method of claim 4 further comprising the step of receiving a third request to customize said first mobile service, said third request to customize delivered via said mobile telephone.

6. The method of claim 5 further comprising:
   (a) customizing said first mobile service based on said third request to customize; and
   (b) sending a mobile service generated response to said mobile telephone, wherein said sending step occurs subsequent to said receiving a third request to customize step.

7. The method of claim 6 wherein said first mobile service further comprises:
   (a) recognizing said mobile telephone based on information from said third request to execute;
   (b) validating said second request to execute; and
   (c) preventing changes to said first mobile service.

8. The method of claim 7 wherein further comprising a means for determining a ratio of the number of text messages said mobile service receives and the number of text message said mobile service sends.

9. The method of claim 1 wherein said first mobile service further comprises:
   (a) recognizing said text message communication device based on information from said second request to execute;
   (b) validating said second request to execute; and
   (c) preventing changes to said first mobile service.

10. The method of claim 1 wherein said first mobile service and said second mobile service are the same.

11. A method of operating a mobile service comprising the steps of:
    (a) providing a reference table for a user, said reference table comprising access numbers and mobile service labels associated therewith;
    (b) receiving a first electronic request to execute a mobile service, said first request comprising an access number delivered via a text message sent from a first user's text message communication device to a server;
    (c) determining the MSISDN of said text message communication device subsequent to said receiving step;
    (d) determining a mobile service to execute from said reference table;
    (e) executing said mobile service; and
    (f) sending data via text message to a second user's text message communication device.

12. The method of claim 11 wherein said text message communication device is a mobile telephone.

13. The method of claim 11 further comprising receiving a second electronic request from a user to edit said reference table.

14. The method of claim 13 wherein said second electronic request is delivered via the World Wide Web.

15. The method of claim 13 wherein said second electronic request is delivered via a mobile telephone.

16. The method of claim 11 wherein said MSISDN is said user's telephone number.

17. The method of claim 16 further comprising receiving a second electronic request from a user to edit said reference table wherein said second electronic request is delivered via a mobile telephone.

18. The method of claim 17 wherein further comprising a means for determining a ratio of the number of text messages said mobile service receives and the number of text message said mobile service sends.

19. A tangible machine readable medium having stored thereon a plurality of instruction sequences, the plurality of instruction sequences including sequences of instructions, which, when executed by a process, cause the processor to perform the steps of:
    (a) receiving an electronic request via the World Wide Web or WAP to create a mobile service, said electronic request comprising instructions to modify a mobile service template;
    (b) creating said mobile service from said instructions and said template;
    (c) receiving a request to execute said mobile service, said request to execute delivered via a text message communication device to a server wherein said server is adapted to communicate with said text message communication device; and
    (d) executing said mobile service to generate data; and
    (e) sending said data via text message to said text message communication device.

* * * * *